US008452815B2

(12) United States Patent
Smith et al.

(10) Patent No.: US 8,452,815 B2
(45) Date of Patent: May 28, 2013

(54) SYSTEM AND METHODS FOR MANAGEMENT OF RISK DATA AND ANALYTICS

(75) Inventors: Meredith Smith, Lake Forest, IL (US); James David Haddox, Upper Stepney, CT (US)

(73) Assignee: Purdue Pharma L.P., Stamford, CT (US)

( * ) Notice: Subject to any disclaimer, the term of this patent is extended or adjusted under 35 U.S.C. 154(b) by 346 days.

(21) Appl. No.: 12/237,853

(22) Filed: Sep. 25, 2008

(65) Prior Publication Data

US 2009/0083334 A1    Mar. 26, 2009

Related U.S. Application Data

(60) Provisional application No. 60/975,102, filed on Sep. 25, 2007.

(51) Int. Cl.
*G06F 17/30*    (2006.01)
(52) U.S. Cl.
USPC ............... 707/802; 707/728; 707/796; 705/2
(58) Field of Classification Search
USPC ............... 707/999.107, 728, 796, 802; 705/2
See application file for complete search history.

(56) References Cited

U.S. PATENT DOCUMENTS

| | | | | |
|---|---|---|---|---|
| 6,219,674 | B1 * | 4/2001 | Classen | 1/1 |
| 6,993,402 | B2 * | 1/2006 | Klass et al. | 700/103 |
| 2007/0185751 | A1 * | 8/2007 | Dempers | 705/7 |

OTHER PUBLICATIONS

Ducharme et al., "Drug Abuse Warning Network: Development of a New Design", Development of a New Design for DAWN, prepared by Department of Health and Human Services, Aug. 2002, pp. 1-126.*
Butler et al., "Internet Surveillance: Content Analysis and Monitoring of Product-specific Internet Prescription Opioid Abuse-related Postings," *The Clinical Journal of Pain*, vol. 23, No. 7, pp. 619-628 (Sep. 2007).
http://web.archive.org/web/20070626063526/http://www.radars.org, Researched Abuse, Diversion, and Addiction-Related Surveillance (RADARS®), 2 pages (Jun. 26, 2007).
http://www.radars.org, About the RADARS System, 2 pages (printed Feb. 3, 2010).
http://www.radars.org/About the RADARSystem/RADARS-SystemCharacteristics.aspx, RADARS System Characteristics, 2 pages (printed Feb. 3, 2010).
http://web.archive.org/web/20070922105131/http://dawninfor.samhsa.gov, Welcome to the New Drug Abuse Warning Network (DAWN) 2 pages (printed Feb. 3, 2010).

(Continued)

*Primary Examiner* — Monica Pyo
(74) *Attorney, Agent, or Firm* — Troutman Sanders LLP

(57) ABSTRACT

Managing and analyzing occurrences of certain types of adverse events associated with a distribution of a prescription drug into the commercial marketplace, such as a drug having an associated abuse liability potential. Data concerning an occurrence of an adverse event associated with such distribution is received and selectively logged as an event if the data satisfies one or more predetermined criteria which can be used to filter the received data. If the received data are logged as an event, a score is computed and assigned to the event. If the score meets or exceeds a pre-established threshold, a field researcher is assigned to investigate the logged event. Further data from the field researcher are stored in association with the logged event. Automated review of further data from field researchers can be performed to update the status of a logged event to closed.

19 Claims, 3 Drawing Sheets

OTHER PUBLICATIONS http://web.archive.org/web/20070706004115/dawninfo.samhsa.gov/collect, Collecting the Data, 2 pages (printed Feb. 3, 2010).

http://web.archive.org/web/20070921233150/dawninfor.samhsa.gov/about, About the New DAWN, 1 page (printed Feb. 3, 2010).

http://www.inflexxion.com/offering.aspx?id=124&linkidentifier=id&intemid=124, NAVIPPRO/Inflexxion, 1 page (printed Feb. 3, 2010).

* cited by examiner

SYSTEM AND METHODS FOR MANAGEMENT OF RISK DATA AND ANALYTICS

This application claims the benefit of priority to U.S. Provisional Patent Application No. 60/975,102, filed Sep. 25, 2007, the disclosure of which is hereby incorporated by reference in its entirety.

FIELD OF THE INVENTION

The present invention relates generally to prescription drug risk management systems and to managing and analyzing occurrences of certain types of adverse events associated with the distribution of a prescription drug in the commercial marketplace.

BACKGROUND OF THE INVENTION

Prescription drug manufacturers are concerned with adverse events experienced by users of their prescription drugs. An adverse event is an identified, undesirable experience associated with the use of a particular prescription drug in a particular person as reported by an identifiable individual. For example, an adverse event may involve a specific side effect (e.g. nausea, dizziness) experienced by a particular user of the prescription drug. When a prescription drug manufacturer learns of an adverse event, the manufacturer will typically seek information about the particular user, the reporter of the event, the drug associated with the event, and a description of the adverse experience. Software-based systems have been developed to store and analyze such data. However, certain adverse events, namely, abuse and diversion, associated with the distribution of a prescription drug that has an associated abuse liability potential have not been adequately addressed in existing software-based systems. Examples of such adverse events include theft of prescription drugs, black market sales of prescription drugs, misuse of a prescription drug in a community, abuse and addiction to a prescription drug in a particular community, and the like. Accordingly, what is needed is a system to analyze and manage occurrences of certain adverse events such as abuse and diversion associated with a distribution of prescription drugs that have associated abuse liability potential into the commercial marketplace.

SUMMARY OF THE INVENTION

The present invention provides a system and method for managing and analyzing occurrence of certain adverse events associated with the marketing and distribution of a prescription drug having an associated abuse liability potential (e.g., abuse and diversion). In accordance with one aspect of the present invention, data is received concerning an occurrence of specific types of adverse events such as abuse and diversion associated with a distribution of a prescription drug having an associated abuse liability potential. The received data is selectively logged as an event if the data satisfies predetermined set of criteria (including one predetermined criterion). Such criteria can be used to filter the received data based on, for example, the type of drug or event involved. If the received data qualify as an event, the event is logged into the system, and a score is computed (based on the nature of the received data) and assigned to it. If the score satisfies a threshold, a field researcher is then assigned to investigate the logged event and to collect further data about the event (e.g, through interviews with key individuals in the affected community; sometimes referred to as "field data"). Thereafter, the field data provided by the field researcher is stored in association with the logged event. Reports based on the initially received data and the subsequently collected data can be generated to provide an analysis of the risks associated with a distribution of the particular prescription drug having an associated abuse liability potential into the market.

In accordance with more detailed aspects of the present invention, the received data are logged as an event if the received data concern one of a predetermined set of prescription drugs having an associated abuse liability potential. In one embodiment, the received data are parsed to confirm whether the data concerns one of a predetermined set of drugs. In another embodiment, an interface to the system is provided, e.g., a software interface, to enable an operator to confirm that the received data concerns one of a predetermined set of drugs.

In accordance with a further aspect of the present invention, the received data are logged as an event if the received data concern one of a predetermined set of adverse events. In one embodiment, the predetermined set of adverse events includes one or more of a misuse, an abuse, or a diversion of the drug associated with the received data.

In accordance with still another aspect of the present invention, the received data includes at least one characteristic of the occurrence of the adverse event reported in the received data and includes, for example, a geographic location, a type of person, a magnitude, a setting, or the like. Furthermore, a score is assigned individually to one or more of the characteristics included in the received data and the individual scores are combined to form a score for the received data. Thereafter, the score is compared against one or more threshold values to determine whether a field researcher should be assigned to the received data. For example, a field researcher can be assigned if a score exceeds an established threshold value.

In accordance with yet another aspect of the present invention, a targeted intervention plan is established for a logged event to mitigate possible future occurrences of certain adverse event types such as noted above which are associated with the logged event. The targeted intervention plan is stored in association with the logged event.

BRIEF DESCRIPTION OF THE DRAWINGS

In the figures, like reference numerals refer to like parts throughout the various figures unless otherwise specified.

For a better understanding of the present invention, reference is made to the following Detailed Description Of Certain Embodiments Of The Invention, which is to be read in association with the accompanying figures, wherein.

DETAILED DESCRIPTION OF CERTAIN EMBODIMENTS OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form entirely of a hardware embodiment, or entirely of a software embodiment, or of an embodiment combining both software and hardware aspects. The following detailed description is, therefore, not to be taken in a limiting sense.

Figure 1:
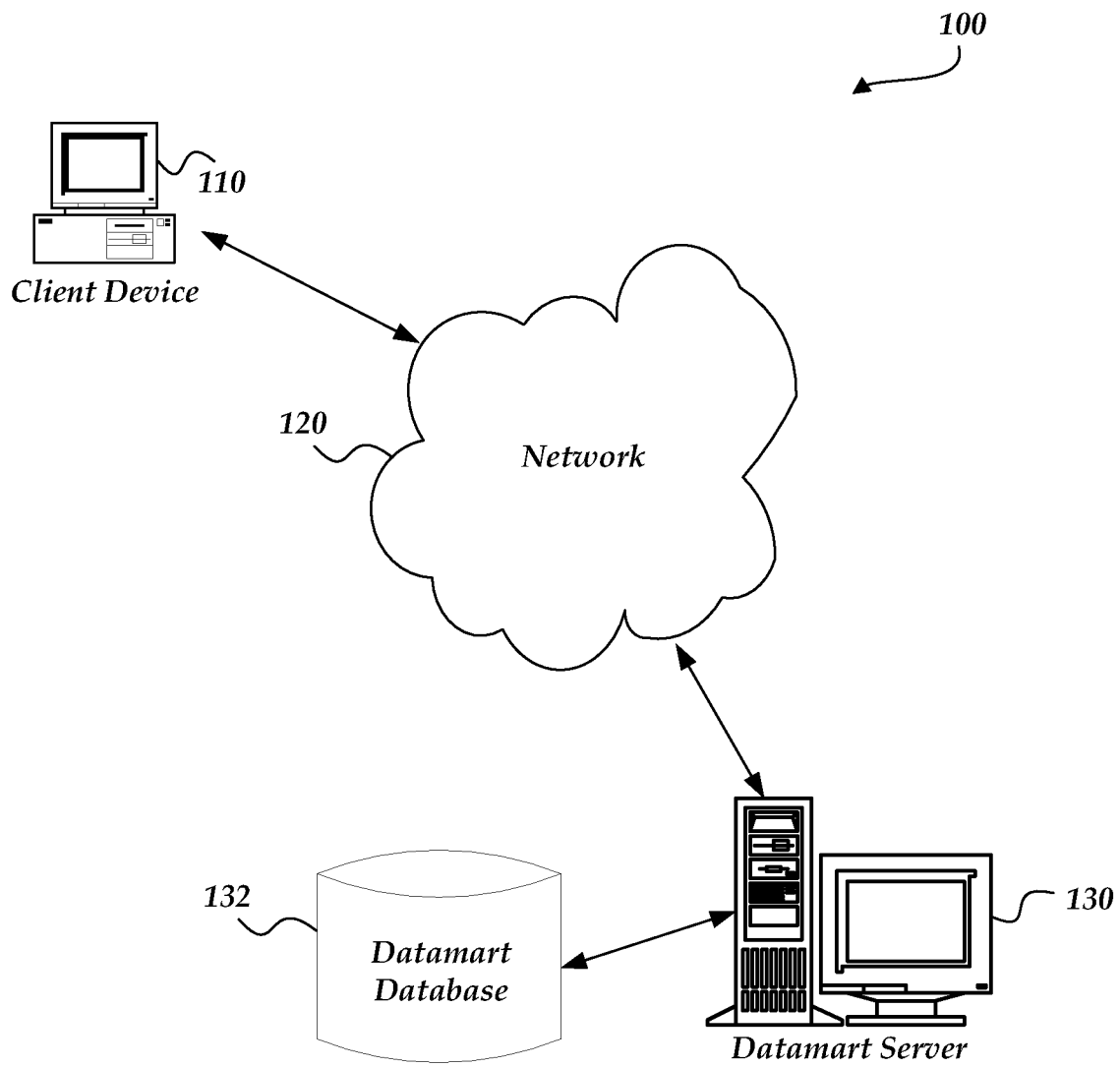
FIG. 1 illustrates a diagram of an exemplary system in accordance with the present invention.

FIG. 1 depicts a diagram of an exemplary system 100 in accordance with the present invention. System 100 includes network 120, datamart server 130, datamart database 132, and client device 110. Various components of system 100 including datamart server 130, datamart database 132, and client device 110 can be embodied as one or more computing devices. An exemplary computing device is described below with reference to FIG. 3. As will be appreciated by persons skilled in the art, additional components can be utilized along with the components shown in FIG. 1.

Network 120 enables computing devices such as client device 110 and datamart server 130 to communicate with each other. Network 120 can be composed of one or more distinct networks including, for example, an intranet, the Internet, a wireless network, an overlay network, a cellular network or other types of networks, as will be appreciated by persons skilled in the art.

Client device 110 enables a user to interact with a server, such as datamart server 130, over network 120. A "client" can be any device capable of communicating with a server and receiving input directly from a user. A client can be, for example, a personal computer, a personal digital assistant (PDA), a cell phone or other types of devices, as will be appreciated by persons skilled in the art.

Datamart server 130 is an embodiment of a server that enables management and analysis of an occurrence of specific types of adverse events associated with distribution of a prescription drug having an associated abuse liability potential into the commercial marketplace in accordance with the present invention. The datamart server 130 can comprise any of a number of conventional servers with a datamart process 200 (FIG. 2) executing as software on one or more processors thereof or, in part, on processors of other servers in communications therewith. An exemplary process for managing and analyzing an occurrence of an event is described below with reference to software executing on the datamart server 130. The datamart server 130 can be implemented as a website by a web server or in another form, as will be appreciated by persons skilled in the art.

Figure 2:
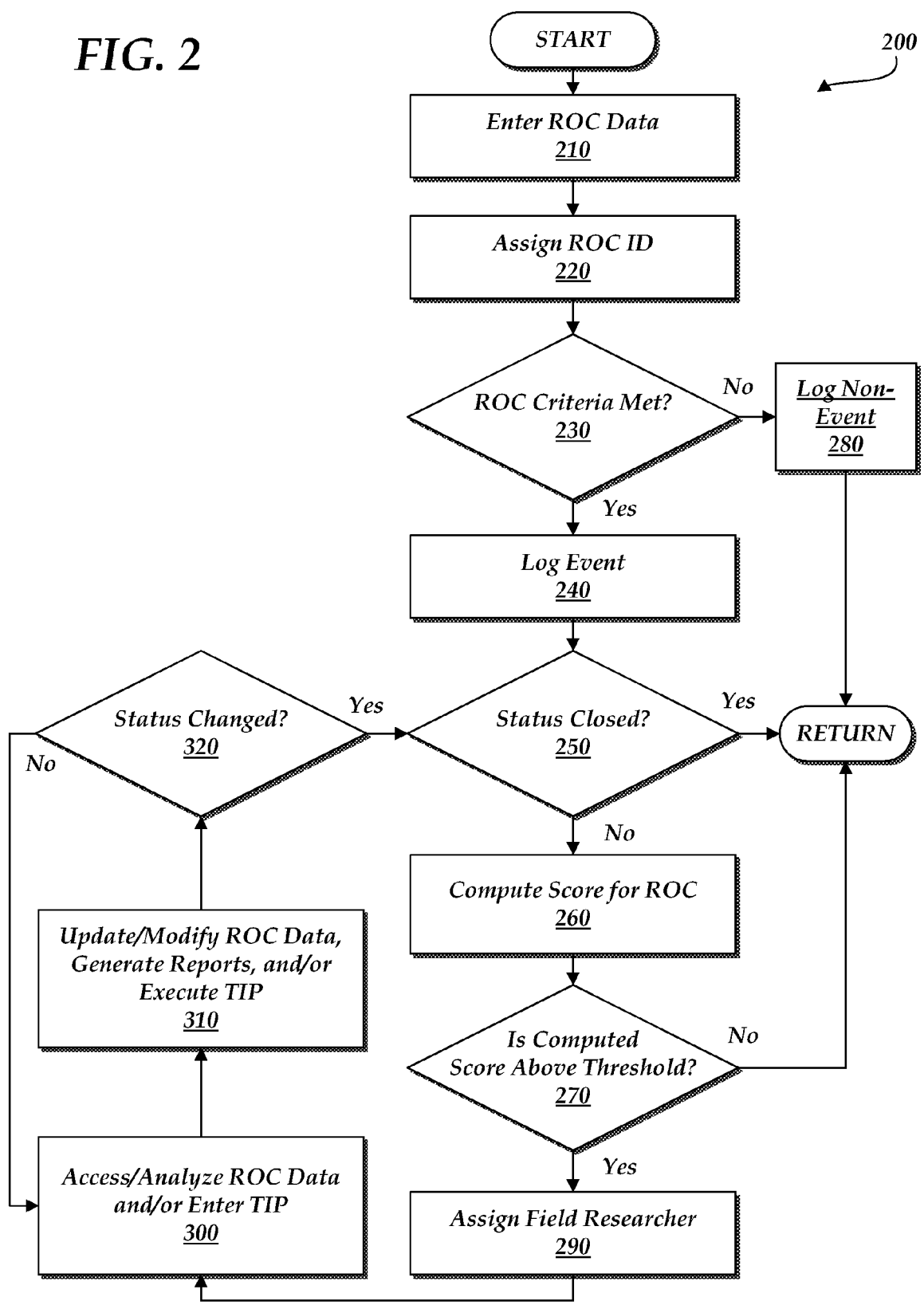
FIG. 2 is a flow chart of an exemplary process for managing and analyzing an occurrence of a risk associated with a distribution of a prescription drug into market.

FIG. 2 is a flow chart of an exemplary process 200 for managing and analyzing an occurrence of an adverse event associated with a distribution of a prescription drug having an associated abuse liability potential into the commercial marketplace. Exemplary process 200 can be executed by a server such as, for example, datamart server 130 of FIG. 1. Moving from a start block, the process steps to block 210 where data for a report of concern is entered. A report of concern ("ROC") identifies at least a drug and an event which describes an occurrence or an alleged occurrence of an event associated with a distribution of a prescription drug into the marketplace. For example, a ROC can be a newspaper article which reports a pharmacy robbery. In another example, a ROC can be a statement made by a physician to a drug manufacturer sales representative indicating that a misuse of a particular prescription drug is rampant in a particular community. A report of concern may rise to a documented adverse event once the datamart database 132 includes information that identifies the person reporting the event, the drug, the event itself and the patient. The datamart of the present invention enables management (including follow-up and searches of the database) and analysis to determine whether the inputted data can be identified as a true adverse event. In one embodiment, ROC data is entered automatically as a result of a scanning, recognizing, or parsing process operating upon a newspaper article, a handwritten report, an audio file, and the like. A recognition software module can match terms from a database with headlines or articles so as to cause entry of ROC data in accordance with automated criteria processing. In another embodiment, an interface is provided to enable a user to input the ROC data.

Advancing to block 220, an identifier is assigned to the ROC data entered in block 210. Additionally, the identifier (ROC ID) and the ROC data are stored in a database, such as, for example, the datamart database 132 of FIG. 1. A ROC ID can be utilized to reference its associated ROC data in the database and can be used to refer to a particular ROC.

Flowing to block 230, a check is made to determine whether the ROC data entered in block 210 is an event which concerns an operator of the exemplary process 200. For example, the operator may be concerned only about ROCs that pertain to one of a predetermined set of drugs. In another example, the operator may be concerned only about ROCs that pertain to any one of a predetermined set of events such as misuse, abuse, or diversion of a prescription drug. Accordingly, an interface is provided to enable the operator to specify one or more criteria to indicate which types of ROCs the operator is concerned with. If the ROC meets the predetermined criteria, process 200 advances to block 240 where the ROC is logged as an event in the database and marked as having a status of "open." If the ROC does not meet the predetermined criteria, process 200 advances to block 280 where the ROC is logged as a non-event in the database and the process returns to performing other actions.

It should be understood that the operator can be a set of rules that process ROC events on an automated basis and direct particular ROCs to particular system users as a function of the particular criteria matching a particular ROC.

Among other actions that can be performed are searches of the database of ROCs that have been inputted, including active ROCs being handled by field researchers and ROCs that have been investigated and "closed," meaning no further follow-up is warranted based on the presently computed risk score or because no follow-up was possible. The search parameters can comprise a series of terms combined in a Boolean or structured manner using a suitably configured interface.

Next, advancing to block 250 from block 240, a check is performed to determine if the status of the ROC is closed. If the status of the ROC is "closed," the process returns to performing other actions. Otherwise, the process continues to block 260.

Moving to block 260, a score is computed for the ROC. In one embodiment, a score is assigned individually to each of several characteristics describing the ROC. A characteristic can include a geographic location, a type of person (e.g., youth, young adult, older adult), a magnitude (e.g., how many bills were stolen or how many people were caught abusing the drug), a setting (e.g., within an elementary school zone or a pharmacy), or the like. An individual score for a characteristic can be based on a predetermined set of categories, rules, or values. For example, a ROC concerning one of several geographic locations that are known to have higher rates of drug abuse can be assigned a different score than those ROCs that concern other geographic locations. In another example, a ROC concerning a minor can be assigned a different score than a ROC concerning an adult. In yet another example, a ROC concerning large quantities of a drug can be assigned a different score than a ROC concerning smaller quantities of a drug. In still yet another example, a ROC concerning an event at a school setting can be assigned a different score than a ROC concerning an event at an office. Additionally, the individual scores assigned to several of the characteristics of a ROC can be combined to form a score for the ROC. For example, the individual scores can be weighted, summed, averaged and the like.

Advancing to block 270, the computed score of block 260 is compared to a predetermined threshold. The comparison is to determine whether the score of a particular ROC warrants investigation and follow-up by a field researcher. If the computed score is above the predetermined threshold, the process continues to block 290. Otherwise, the process returns to performing other actions. In another embodiment, the computed score is compared against a range specified by predetermined lower and higher threshold values. If the computed score is greater than the lower threshold of the range but less than the higher threshold of the range, the process continues to block 290. As will be appreciated by persons skilled in the art, other types of comparisons can be substituted in block 270. For example, rather than continuing to block 290 if the score is greater than a predetermined threshold, another embodiment of process 200 can be configured to advance to block 290 if the score is less than a predetermined threshold.

Moving to block 290, a field researcher is assigned to investigate the ROC whenever investigation or follow-up by a field researcher is appropriate (e.g., when the threshold requirement is met). In one embodiment, a field researcher is assigned based on the field researcher's experience level and the computed score. For example, if the computed score is above a priority threshold, a more experienced field researcher may be assigned to the ROC. This determination can be part of a one-or two-step comparison to the computed score.

Flowing to block 300, an interface is provided to enable a user to access the ROC data, analyze the ROC data and/or enter a targeted intervention plan ("TIP") for the particular ROC having a score exceeding the threshold, or other ROCs associated with (e.g. assigned to or under supervisory review of) the user that have not already been closed. As will be appreciated by persons skilled in the art, various analytic techniques can be utilized to provide analysis of the ROC data in relation to other ROC data that are stored in the database. A TIP is a plan to address the ROC or to reduce the risk of future occurrences of similar ROCs in that community. For example, if a ROC indicates that a particular pharmacy chain is experiencing a higher rate of thefts of a prescription drug of concern, a TIP may include a plan to investigate the security measures of the particular pharmacy chain and to potentially reduce the amount of drugs supplied to the pharmacy chain unless its security measures are improved.

Advancing to block 310, an interface is provided to enable a user to update and/or modify the ROC data for any of the ROC data files accessible to the user at block 300. Updates and modifications may be necessary as the field researcher investigates and learns more about the ROC. Furthermore, an interface is provided to enable a user to generate reports based on the ROC data. As will be appreciated by persons skilled in the art, various reporting techniques can be utilized to allow a user to present the analysis performed in block 300. Additionally, as the plan outlined in the TIP is executed, the TIP may be updated and modified.

Moving to block 320, a check is performed to determine if the status of the ROC has changed. For example, if no additional investigation by the field researcher is required or if the TIP has been completed, the status of the ROC can be set to "closed" by the user. Furthermore, if updates and modifications to the ROC data and/or TIP require a reevaluation of the score for the ROC, the status of the ROC can be indicated as requiring an update. If the status has changed, the process continues to block 250. Otherwise, the process loops to block 300 for handling by the assigned field researcher.

It will be understood that each block in the flowchart, and combinations of blocks in the flowchart, can be implemented by computer program instructions. These program instructions may be provided by software or firmware to a processor to produce a machine, such that the instructions, which execute on the processor, implement the actions specified in the various flowchart blocks. The computer program instructions may be executed by a processor to cause a series of operational steps to be performed by the processor. It will also be understood that each block of the flowchart, and any combination of blocks in the flowchart, can be implemented by special purpose hardware-based systems which perform the specified actions or steps.

Figure 3:
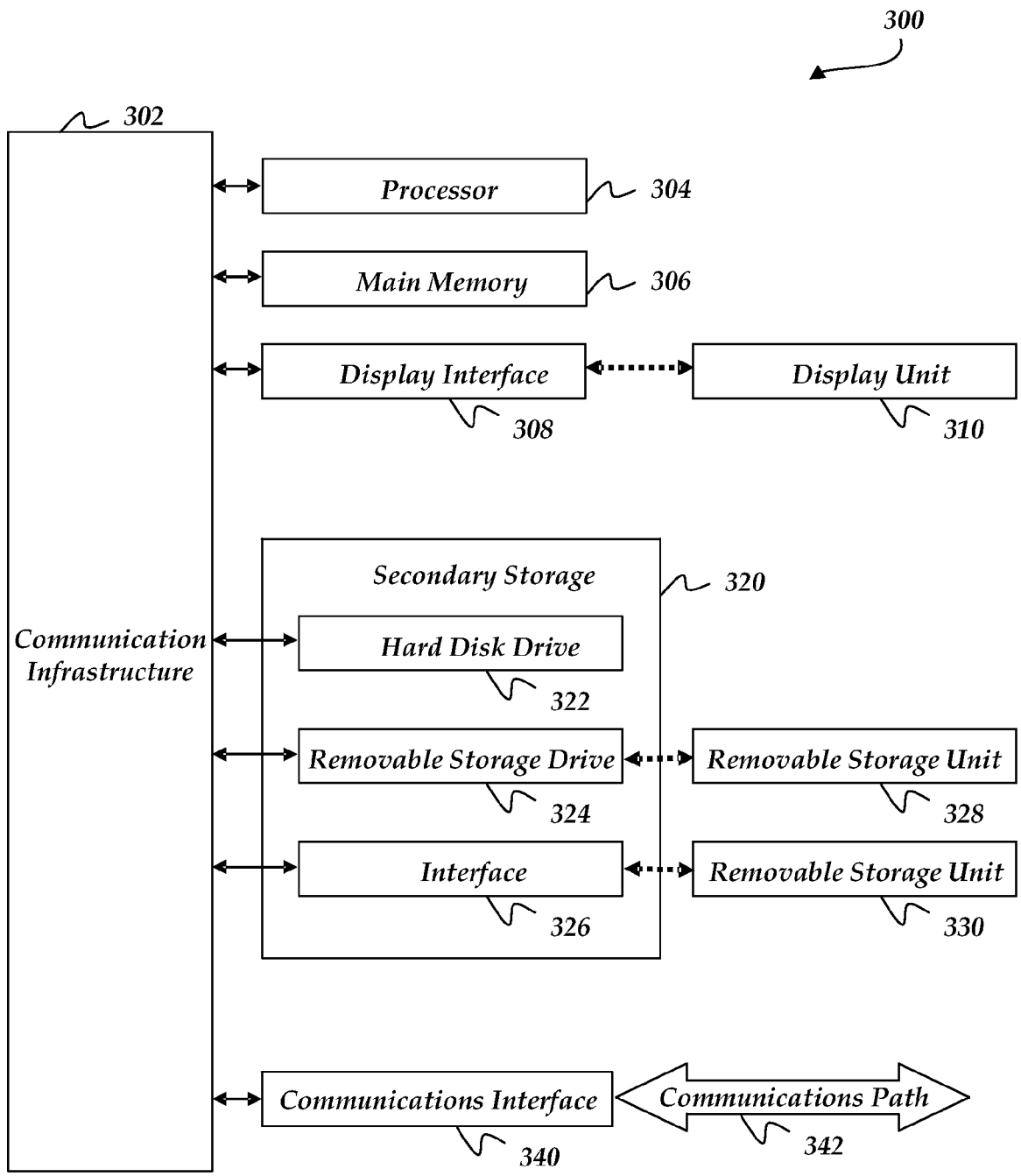
FIG. 3 illustrates a block diagram of an exemplary computer system in accordance with the present invention.

The following description of a general purpose computer system is provided for the sake of completeness. Embodiments of the present invention can be implemented in hardware, or as a combination of software and hardware. Consequently, the invention can be implemented in the environment of a computer system or other processing systems. An example of such a computer system 300 is shown in FIG. 3. The processing blocks or steps of FIG. 2, for example, can execute on one or more distinct computer systems 300 (or a server such as the datamart server 130), to implement the various methods of the present invention. Computer system 300 includes one or more processors, such as processor 304. Processor 304 can be a special purpose or a general purpose digital signal processor. Processor 304 is connected to communication infrastructure 302 (for example, a bus or network).

Computer system 300 can include display interface 308 that forwards graphics, text, and other data from communication infrastructure 302 (or from a frame buffer not shown) for display on display unit 310. Display unit 310 can be, for example, a liquid crystal display (LCD), a plasma display panel (PDP), touch-screen display, and the like.

Computer system 300 also includes main physical memory 306, preferably RAM, and can also include secondary storage 320. Secondary storage 320 can include, for example, hard disk drive 322 and/or removable storage drive 324, representing a floppy disk drive, a magnetic tape drive, an optical disk drive, a flash memory card reader or the like. Removable storage unit 328 represents a floppy disk, magnetic tape, optical disk, flash memory card, or the like, which is read by and written to by removable storage drive 324. As will be appreciated, removable storage unit 328 includes a computer usable storage medium having stored therein data.

In alternative implementations, secondary storage 320 can include other similar means for allowing computer programs or other instructions to be loaded into computer system 300. Such means can include, for example, removable storage unit 330 and interface 326. Examples of such means can include a program cartridge and cartridge interface (such as that found in video game devices), a removable memory chip (such as an EPROM, or PROM) and associated socket, and other removable storage units 330 and interfaces 326 which allow data to be transferred from removable storage unit 330 to computer system 300.

Computer system 300 can also include communications interface 340. Communications interface 340 allows data to be transferred between computer system 300 and external devices. Examples of communications interface 340 can include a modem, a network interface (such as an Ethernet card), a wireless transceiver, a communications port, a PCM-CIA slot and card, etc. Data transferred via communications interface 340 are in the form of signals, which can be electronic, electromagnetic, optical, or other signals capable of being received by communications interface 340. These signals can be provided to communications interface 340 via communications path 342. Communications path 342 carries signals and can be implemented using wire or cable, fiber optics, a phone line, a cellular phone link, an RF link and other communications channels.

As used herein, the terms "computer program medium," "computer usable medium," and "processor-readable medium" are used to refer generally to media such as removable storage units 328 and 330, a hard disk installed in hard disk drive 322, and the like. These computer program products are means for providing software to computer system 300.

Computer programs (also referred to as processor-executable code) are stored in main physical memory 306 and/or secondary storage 320. Computer programs can also be received via communications interface 340. Such computer programs, when executed, enable computer system 300 to implement datamart server 130 and other aspects of the present invention as discussed herein. In particular, the computer programs, when executed, enable processor 304 to implement the processes of the present invention, such as all or portions of the method described with reference to FIG. 2, for example. Accordingly, such computer programs represent controllers of computer system 300. Where the invention is implemented using software, the software can be stored in a computer program product and loaded into computer system 300 using removable storage drive 324, interface 326, or communications interface 340.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for managing and analyzing an occurrence of an adverse event associated with a distribution of a prescription drug into the market, comprising the steps of:

receiving data at a server concerning the occurrence of an individual adverse event associated with the distribution of the prescription drug, wherein the received data comprises (a) an event associated with an identified drug and (b) at least two characteristics of the event;

selectively storing the received data on a server as a logged event if the received data meets a predetermined criterion;

computing and storing on a server an individual event score for the logged event based on the received data and assigning the computed score to the event, wherein said computing step comprises assigning an individual score to each of the event and the at least two characteristics separately and combining the separate individual scores to obtain a single value representing the individual event score;

comparing the computed individual event score to a threshold score stored on a server;

assigning a field researcher to the logged event if the computed event score satisfies the threshold score;

thereafter, receiving further data provided by the field researcher in association with the logged event and storing the further data on a server; and generating a report concerning the logged event based on any of the received data, the stored further data, or a computed score.

2. The method of claim 1, including the additional step of automatically marking the logged event as a closed event as a function of the stored further data.

3. The method of claim 1, including the additional step of determining whether the received data meets the predetermined criterion by reviewing a portion of the received data to identify the adverse event, wherein the adverse event is selected from the group consisting of: a misuse, an abuse, and a diversion of the prescription drug.

4. The method of claim 1, including the additional steps of:
establishing a targeted intervention plan for the logged event to reduce future occurrences of the adverse event, wherein the storing step stores further data related to the targeted intervention plan.

5. The method of claim 1, wherein the at least one characteristic of the received data is selected from the group consisting of: a geographic location, a type of person, a magnitude, and a setting.

6. The method of claim 1, wherein each of the steps is performed under control of a software program executing in at least one machine.

7. The method of claim 1, wherein the threshold comprises first and second threshold values and wherein the comparing step includes:
determining whether the computed event score is less than the first threshold value and greater than the second threshold value.

8. The method of claim 1, including the additional step of recomputing the individual event score based on the further data provided by the field researcher.

9. The method of claim 8, wherein the step of recomputing the individual event score is performed automatically upon storing the further data.

10. A system for managing and analyzing an occurrence of an adverse event associated with a distribution of a prescription drug into the market, comprising:
a client; and
a server executing stored instructions to enable actions, including:
receiving data concerning the occurrence of an individual adverse event associated with the distribution of the prescription drug, wherein the received data comprises (a) an event associated with an identified drug and (b) at least two characteristics of the event;
selectively logging the received data as an event if the received data meets a predetermined criterion;
computing an individual event score for the logged event based on the received data, wherein said computing step comprises assigning an individual score to each of the event and the at least two characteristics separately and combining the separate individual scores to obtain a single value representing the individual event score;

comparing the computed individual event score to a threshold;

assigning a field researcher to the logged event if the computed event score satisfies the threshold;

thereafter, storing further data provided by the field researcher in association with the logged event; and generating a report concerning the logged event based on the received data and the stored further data.

11. The system of claim 10, wherein the action of logging comprises:

confirming whether the prescription drug is included within a set of drugs; and logging the data if the prescription drug is confirmed as being in the set.

12. The system of claim 10, including the additional actions of reviewing a portion of the received data to identify the adverse event, wherein the adverse event is selected from the group consisting of: a misuse, an abuse, and a diversion of the prescription drug.

13. The system of claim 10, including the additional actions of establishing a targeted intervention plan for the logged event to reduce future occurrences of the adverse event, wherein the action of storing stores further data related to the targeted intervention plan.

14. The method of claim 10, wherein at least one characteristic of the received data is selected from the group consisting of: a geographic location, a type of person, a magnitude, and a setting.

15. A processor-readable device having processor-executable instructions stored therein, which when executed by one or more processors, enables actions, comprising:

receiving data concerning an occurrence of an individual adverse event associated with the distribution of the prescription drug into the market, wherein the received data comprises (a) an event associated with an identified drug and (b) at least two characteristics of the event;

selectively logging the received data as an event if the received data meets a predetermined criterion;

computing an individual event score for the logged event based on the received data, wherein said computing step comprises assigning an individual score to each of the event and the at least two characteristics separately and combining the separate individual scores to obtain a single value representing the individual event score;

comparing the computed individual event score to a threshold;

assigning a field researcher to the logged event if the computed event score satisfies the threshold;

thereafter, storing further data provided by the field researcher in association with the logged event; and generating a report concerning the logged event based on the received data and the stored further data.

16. The processor-readable device of claim 15, wherein the action of logging comprises:

confirming whether the prescription drug is included within a set of drugs; and logging the data if the prescription drug is confirmed as being in the set.

17. The processor-readable device of claim 15, including the additional action of reviewing a portion of the received data to identify the adverse event, wherein the adverse event is selected from the group consisting of: a misuse, an abuse, and a diversion of the prescription drug.

18. The processor-readable device of claim 15, including the additional actions of:

establishing a targeted intervention plan for the logged event to reduce future occurrences of the adverse event, wherein the action of storing stores further data related to the targeted intervention plan.

19. The processor-readable device of claim 15, wherein at least one characteristic is selected from the group consisting of: a geographic location, a type of person, a magnitude, and a setting.

* * * * *